United States Patent
Gurlahosur et al.

(10) Patent No.: US 10,476,266 B2
(45) Date of Patent: Nov. 12, 2019

(54) POWER BALANCING BETWEEN TWO POWER RAILS

(71) Applicant: Texas Instruments Incorporated, Dallas, TX (US)

(72) Inventors: Sanjay Gurlahosur, Gourock (GB); Rajdeep Mukhopadhyay, Glasgow (GB)

(73) Assignee: Texas Instruments Incorporated, Dallas, TX (US)

( * ) Notice: Subject to any disclaimer, the term of this patent is extended or adjusted under 35 U.S.C. 154(b) by 370 days.

(21) Appl. No.: 14/672,420

(22) Filed: Mar. 30, 2015

(65) Prior Publication Data

US 2015/0288178 A1  Oct. 8, 2015

Related U.S. Application Data

(60) Provisional application No. 61/975,535, filed on Apr. 4, 2014.

(51) Int. Cl.
*H02J 1/10* (2006.01)

(52) U.S. Cl.
CPC .......... *H02J 1/102* (2013.01); *Y10T 307/675* (2015.04)

(58) Field of Classification Search
CPC ....................................... H02J 1/102
USPC ........................................................... 307/75
See application file for complete search history.

(56) References Cited

U.S. PATENT DOCUMENTS

| | | | | |
|---|---|---|---|---|
| 2010/0295383 A1* | 11/2010 | Cummings | ....... | H01L 31/02021 307/151 |
| 2014/0375288 A1* | 12/2014 | Nora | .................. | H02M 3/1584 323/272 |

* cited by examiner

*Primary Examiner* — Joseph Chang
(74) *Attorney, Agent, or Firm* — Lawrence J. Bassuk; Charles A. Brill; Frank D. Cimino

(57) ABSTRACT

A power controller that includes first and second buck controllers and a power balancer. The first buck controller is configured to receive a first power rail at a first voltage and generate a first output signal. The second buck controller is configured to receive a second power rail at a second voltage and generate a second output signal. The power balancer is configured to receive an average current for the output signals and generate, based on the average current, a reference voltage to be received by the second buck controller. The output signals are combined to create a output power rail such that the first buck controller functions as a voltage source for the output power rail and the second buck controller controls, based on the reference voltage, an amount of current in the output power rail received from each of the buck controllers.

16 Claims, 4 Drawing Sheets

POWER BALANCING BETWEEN TWO POWER RAILS

CROSS-REFERENCE TO RELATED APPLICATIONS

The present application claims priority to U.S. Provisional Patent Application No. 61/975,535, filed Apr. 4, 2014, titled "SCHEME TO POWER BALANCE BETWEEN TWO VOLTAGE RAILS," which is hereby incorporated herein by reference in its entirety.

BACKGROUND

Many electronic systems, including solid state drive (SSD) enterprise application systems, require at least two voltage domains for a power supply. These voltage domains may be provided by two power supply rails. The two power supply rails provide different voltages to the system. For instance, one of the power supply rails may provide 12 volts while the second power supply rail may provide 5 volts. Alternatively, one of the power supply rails may provide 5 volts while the second power supply rail may provide 3.3 volts. Generally, multiple output power rails, sometimes as many as five or six output rails, are needed to be generated from the two power supply rails to power various components of the system. Thus, some of the output rails may draw power from one of the power supply rails while the remaining output rails may draw power from the other power supply rail. However, by splitting the output rails between the two power supply rails, power balancing between the two power supply rails is not possible.

SUMMARY

The problems noted above are solved in large part by systems and methods for balancing power between two voltage rails. In some embodiments, a power controller includes first buck controller, a second buck controller, and a power balancer. The first buck controller is configured to receive a first power supply rail at a first voltage and generate a first output signal. The second buck controller is configured to receive a second power supply rail at a second voltage and generate a second output signal. The power balancer is configured to receive an average current for the first and second output signals and generate, based on the average current, a reference voltage to be received by the second buck controller. The first and second output signals are combined to create a output power supply rail such that the first buck controller functions as a voltage source for the output power rail and the second buck controller controls, based on the reference voltage, an amount of current in the output power rail received from each of the first and second buck controllers.

Another illustrative embodiment is a method that includes receiving, by a first buck controller, a first power supply rail at a first voltage. The method also includes receiving, by a second buck controller, a second power supply rail at a second voltage. The method also includes generating a reference voltage based on an average current output by the first and second buck controllers. The method also includes receiving, by the second buck controller, the reference voltage. The method also includes generating an output power supply rail. The output power supply rail is a combination of the output of the first and second buck controllers. The first buck controller functions as the voltage source for the output power rail and the second buck controller controls, based on the reference voltage, an amount of current in the output power rail received from each of the first and second buck controllers.

Yet another illustrative embodiment is a system that includes a first buck controller coupled to a first current sensor, a second buck controller coupled to a second current sensor, an isolation circuit coupled to the first and second current sensors, and a power balancer coupled to the isolation circuit. The first buck controller is configured to receive a first power rail at a first voltage. The second buck controller is configured to receive a second power rail at a second voltage. The first current sensor is configured to receive a first output signal from the first buck controller and sense the current in the first output signal. The second current sensor is configured to receive a second output signal from the second buck controller and sense the current in the second output signal. The isolation circuit is configured to generate an average current of the first and second output signals. The power balancer is configured to receive the average current and generate, based on the average current, a reference voltage to be received by the second buck controller.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
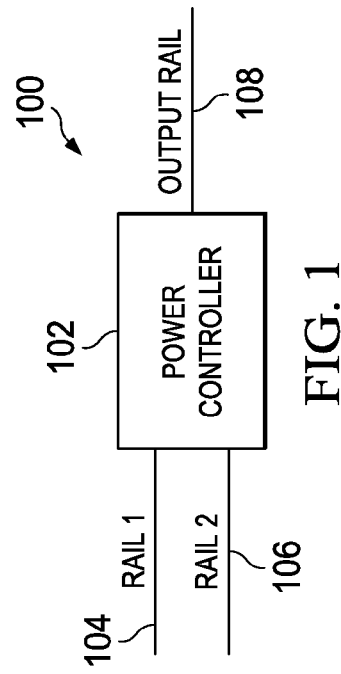
FIG. 1 shows a block diagram of an illustrative power control system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

All electronic systems require power. In many electronic systems, including SSD enterprise application systems, two power supply rails provide power to components within the system. In these systems, the two power supply rails provide two different voltages to the system. For example, in some systems, one of the power supply rails may provide 12 volts while the second power supply rail may provide 5 volts. In other systems, one of the power supply rails may provide 5 volts while the second power supply rail may provide 3.3 volts. These two rails may be utilized to generate multiple output power rails to drive components within the system. In many conventional configurations, multiple high voltage buck converters are coupled to the first of the two power supply rails. Each of these buck converters steps down the voltage and steps up the current of the first power supply rail. Thus, multiple output power sources are created from the first power supply rail to drive certain components within the system. Similarly, multiple low voltage buck converters may be coupled to the second power supply rail creating multiple additional power sources to drive additional components in the system. However, as the buck converters are split up between the two power supply rails, it is not possible to balance the power/current drawn from each of the power supply rails.

To enable power balancing between the two power supply rails, in an embodiment, two buck controllers may be connected to one another in parallel. One of the buck controllers is coupled to the first power supply rail and functions as a voltage source while the second buck controller is coupled to the second power supply rail and functions as a current source for an output power supply rail. Thus, the first buck controller controls the voltage for the output power supply rail and the second buck controller controls the current drawn from each of the buck controllers for the output power supply rail.

The average output current of each of the two buck controllers is sensed and utilized to create a representation of output current. A power balancer then may create a reference voltage based on this representation of output current. The reference current may also be based on instructions that the power balancer may receive that alter the percentage of the total output current that makes up the reference voltage. This reference voltage then is used to drive the second buck controller, the current source. By driving the current source buck controller, the reference voltage may alter the amount of power/current drawn from each of the power supply rails to be combined to generate the output power supply rail.

The output power supply rail then may be utilized to directly drive circuits in the electronic system. Furthermore, additional buck converters may be coupled to the output power supply rail to drive additional circuits. Thus, the system allows for power balancing of two input power supply rails, each of which provide different voltages, and creates an output power supply rail that may be utilized to power the system.

FIG. 1 shows a block diagram of an illustrative power control system 100 in accordance with various embodiments. Power control system 100 includes power controller 102, power supply rails 104 and 106, and output rail 108. Power controller 102 receives power supply rails 104 and 106 and generates output rail 108. Power supply rails 104 and 106 provide direct current (DC) power which may be utilized to power components of an electronic system, such as a SSD system. In some embodiments, power supply rail 104 is at a voltage of 12 volts DC (VDC) while power supply rail 106 is at a voltage level of 5 volts DC (VDC). In an alternative embodiment, power supply rail 104 is at a voltage of 5 VDC while power supply rail 106 is at a voltage level of 3.3 VDC. In another embodiment, power supply rails 104 and 106 may be at any voltage, including power supply rail 104 being at the same voltage as power supply rail 106.

Power controller 102 acts to control the power received from power supply rails 104 and 106 by combining power supply rails 104 and 106 and generating output rail 108. Through this combination, the power drawn from each of power supply rails 104 and 106 may be controlled through adjusting the average current drawn from each of power supply rails 104 and 106. Output rail 108 then may be utilized to power components of the electronic system.

Figure 2:
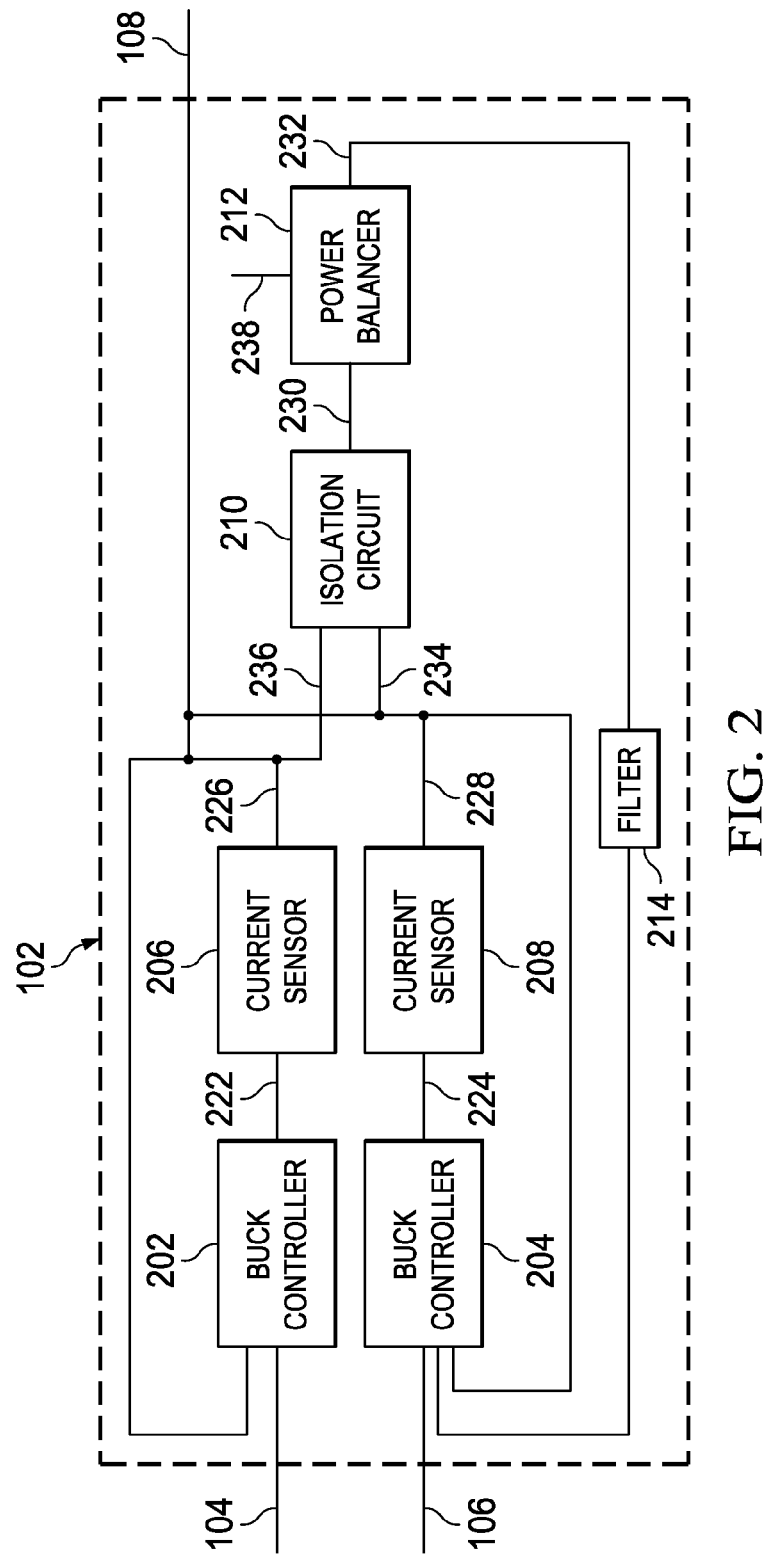
FIG. 2 shows a block diagram of an illustrative power controller in accordance with various embodiments.

FIG. 2 shows a block diagram of power controller 102 in accordance with various embodiments. Power controller 102 may include buck controllers 202 and 204 connected to each other in parallel, current sensors 206 and 208, isolation circuit 210, power balancer 212, and filter 214. Buck controller 202 receives power supply rail 104 while buck controller 204 receives power supply rail 106. Buck controller 202 is a buck converter that is configured to step down voltage received from power supply rail 104 while stepping up the current. Buck controller 204 is a buck converter that is configured to step down voltage received from power supply rail 106 while stepping up the current.

The output signal 222 of buck controller 202 is received by current sensor 206 while output signal 224 of buck controller 204 is received by current sensor 208. Current sensor 206 is configured to sense the current in output signal 222 while current sensor 208 is configured to sense the current in output signal 224. The amount of current sensed by current sensor 206 is received, in the form of signal 236, by isolation circuit 210. Similarly, the amount of current sensed by current sensor 208 is received, in the form of signal 234, by isolation circuit 210. The output signal 226 of current sensor 206 is fed back into buck controller 202 creating a loop. Similarly, the output signal 228 of current sensor 208 is fed back into buck controller 204 forming a loop. Output signals 226 and 228 are combined to create output rail 108.

Isolation circuit 210 acts to isolate the two loops from one another. Isolation circuit 210 combines the output signals 234 and 236 and outputs signal 230 to be received by power balancer 212. The combination of output signals 234 and 236 represents the average current, in the form of signal 230, of the output signal 222 from buck controller 202 and output signal 224 from buck controller 204.

Power balancer 212 receives signal 230, the average current of the buck controllers 202 and 204, and generates reference voltage 232 based on the average current. Power balancer 212 may also receive command instructions via signal 238 which may be carried via a serial connection such as an inter-integrated circuit (I2C) connection. In an embodiment, the command instructions may instruct power balancer 212 as to the percentage of the average current, as represented by signal 230, that is to be output as reference voltage 232. Reference voltage 232 is received by buck controller 204 as a reference voltage. Reference voltage 232 may be filtered by filter 214, prior to being received by buck controller 204 as a reference voltage. Filtering voltage 232 acts to slow the signal comprising reference voltage 232. Thus, buck controller 202 may function as the master while buck controller 204 follows buck controller 202 as any disturbance in buck controller 202's loop propagates to buck controller 204's loop at a slower rate due to the filter 214. Additionally, any disturbance in buck controller 204's loop will be seen by buck controller 202's loop which may react to it. However, due to the filter 214, the reaction by buck controller 202 will not affect buck controller 204's loop due to the slower rate caused by filter 214.

Output signal 226, an output of buck controller 202, may act as the voltage source for output rail 108 while output signal 228, an output of buck controller 204, functions as the current source for output rail 108. Buck controller 204 responds to reference voltage 232 to readjust current flowing via output signal 224. Therefore, buck controller 204, acting as the current source for output rail 108, controls the amount of current that output rail 108 receives from buck controller 204 and power supply rail 106. Additionally, because the remaining current required to drive a load utilizing output rail 108 is provided by signal 226, buck controller 204 functions to control the amount of current that output rail 108 receives from buck controller 202 and power supply rail 104.

Figure 3A:
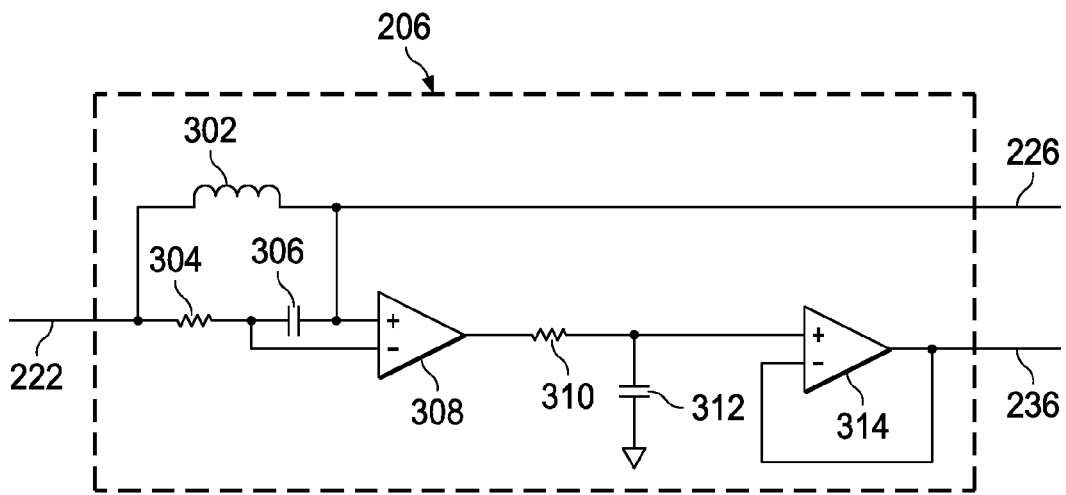
FIG. 3A shows a circuit diagram of an illustrative current sensor in accordance with various embodiments.
Figure 3B:
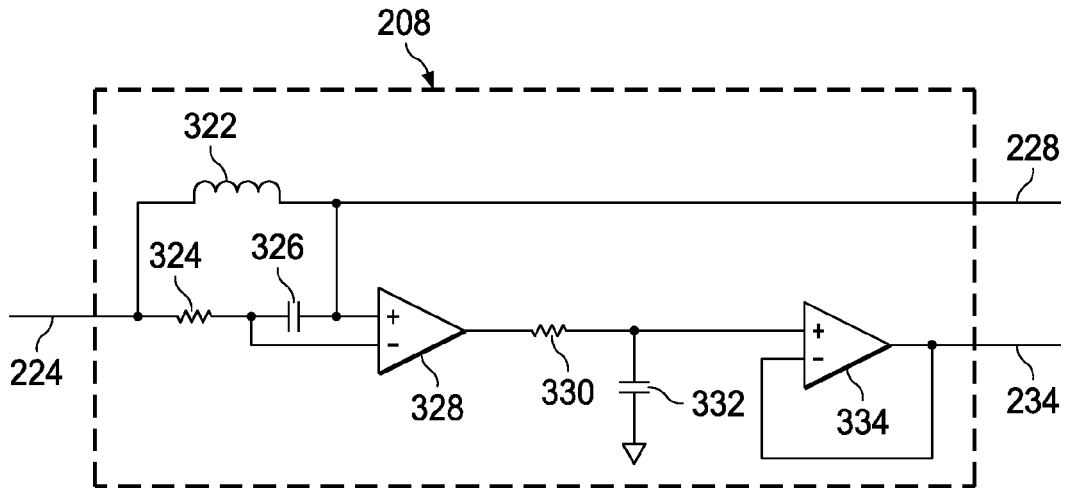
FIG. 3B shows a circuit diagram of an illustrative current sensor in accordance with various embodiments.

FIG. 3A shows a circuit diagram of current sensor 206 in accordance with various embodiments. FIG. 3B shows a circuit diagram of current sensor 208 in accordance with various embodiments. While FIGS. 3A and 3B depict a specific type of current sensor, any type of current sensor may be used. As shown in FIG. 3A, current sensor 206 may include inductor 302, resistor 304, capacitor 306, amplifier 308, resistor 310, capacitor 312, and amplifier 314. As shown in FIG. 3B, current sensor 208 may include inductor 322, resistor 324, capacitor 326, amplifier 328, resistor 330, capacitor 332, and amplifier 334.

Current sensor 206 receives output signal 222 from buck controller 202 while current sensor 208 receives output signal 224 from buck controller 204. In FIG. 3A, output signal 222 passes through inductor 302, resistor 304, and capacitor 306. The current flowing in signal 222 may then be measured utilizing a direct current resistance (DCR) technique. Resistor 304 and capacitor 306 may create a low-pass filter across inductor 302 to enable differential sensing of the inductor DCR voltage drop. In FIG. 3B, output signal 224 passes through inductor 322, resistor 324, and capacitor 326. The current flowing in signal 224 may then be measured utilizing a direct current resistance (DCR) technique. Resistor 324 and capacitor 326 may create a low-pass filter across inductor 322 to enable differential sensing of the inductor DCR voltage drop.

The current sensed by current sensor 206 is amplified by amplifier 308 and 314 and output as signal 236 which is received by isolation circuit 210. The current sensed by current sensor 208 is amplified by amplifier 328 and 334 and output as signal 234 which is received by isolation circuit 210. Output signals 226 and 228 are combined to comprise output rail 108.

Figure 4:
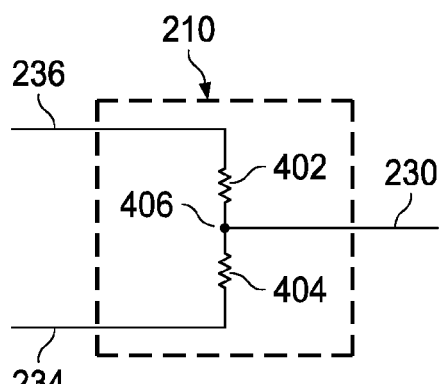
FIG. 4 shows a circuit diagram of an illustrative isolation circuit in accordance with various embodiments.

FIG. 4 shows a circuit diagram of isolation circuit 210 in accordance with various embodiments. Isolation circuit 210 may include resistors 402 and 404 and node 406. Isolation circuit 210 combines the output signals 234 and 236 and outputs signal 230 to be received by power balancer 212. This combination may occur at node 406 between resistors 402 and 404. Based on the current sensing and processing done by current sensors 206 and 208, the voltage at node 406 is a representation of the average current of output signals 222 and 224 from buck controllers 202 and 204, respectively. Therefore, signal 230 represents the average current of output signals 222 and 224 from buck controllers 202 and 204, respectively, which is received by power balancer 212.

Figure 5:
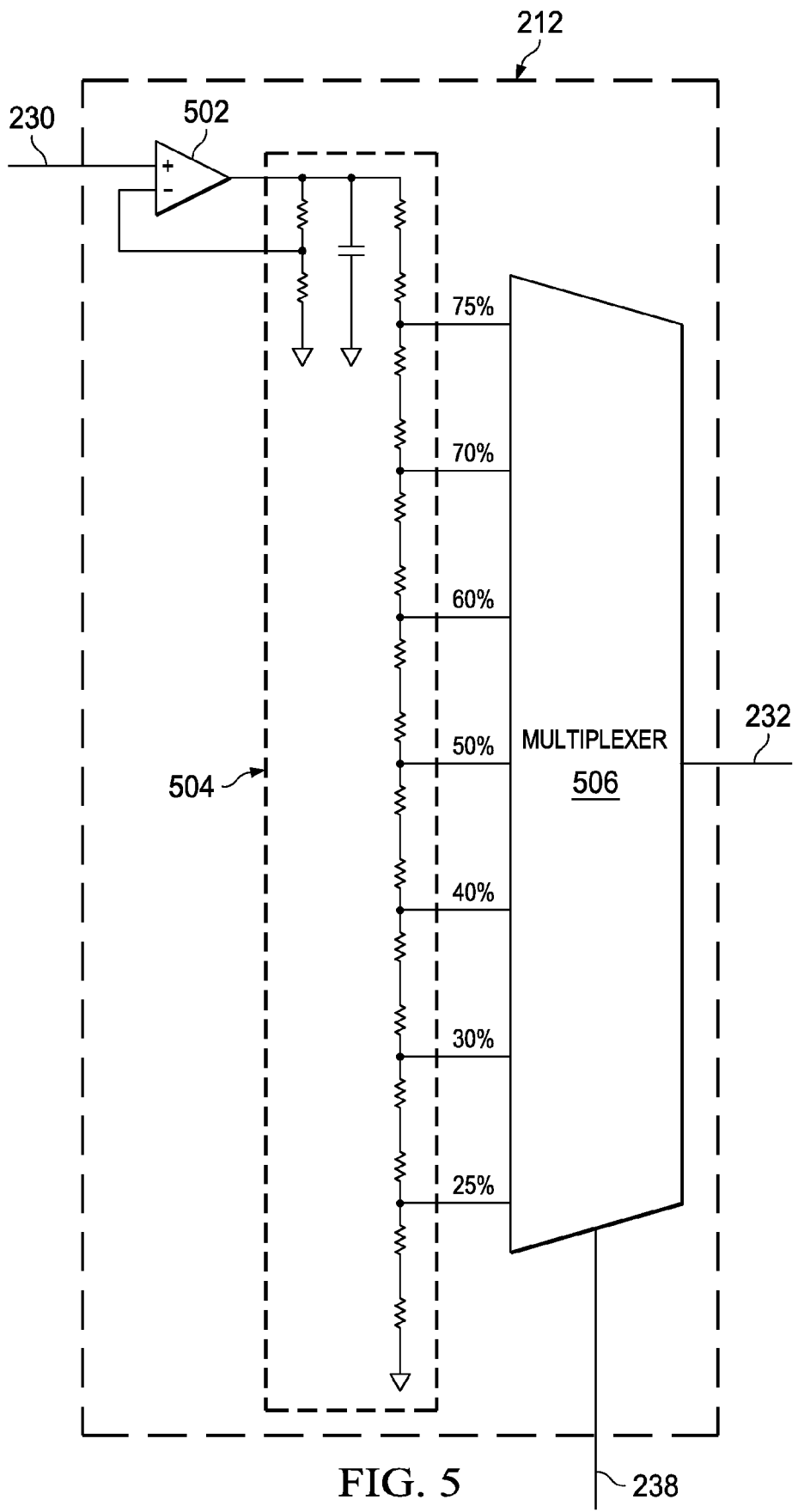
FIG. 5 shows a circuit diagram of an illustrative power balancer in accordance with various embodiments.

FIG. 5 shows a circuit diagram of power balancer 212 in accordance with various embodiments. Power balancer 212 may include amplifier 502, resistor ladder 504, and multiplexer 506. Amplifier 502 receives the signal 230 representing the average current of output signals 222 and 224 from buck controllers 202 and 204, respectively and amplifies the signal for further processing. The signal then flows through resistor ladder 504 such that multiplexer 506 receives multiple signals which each represent a percentage of the total current.

For example, multiplexer 506 may receive 7 signals, one signal representing 75% of the total current, one signal representing 70% of the total current, one signal representing 60% of the total current, one signal representing 50% of the total current, one signal representing 40% of the total current, one signal representing 30% of the total current, and one signal representing 25% of the total current. In other examples, multiplexer 506 may receive any number of signals representing any percentage of the total current.

Multiplexer 506 selects one of the signals and forwards the selected input into a single output as reference voltage 232. Multiplexer 506 may receive command instructions via signal 238 which may be carried via a serial connection. In an embodiment, the command instructions may instruct multiplexer 506 as to which signal from the resistor ladder 504 to select as reference voltage 232. For example, the command instructions may instruct multiplexer 506 to select the signal representing 50% of the total current. Multiplexer 506 then may output the selected signal as reference voltage 232, in this example, the signal representing 50%. Thus, multiplexer 506, as well as power balancer 212, may be programmable. Reference voltage 232 drives buck controller 204.

Because buck controller 204 functions as the current source for output rail 108, the reference voltage 232 acts to control, through buck controller 204, how much current output rail 108 is generated by buck controller 202 and how much current is generated by buck controller 204. In an example, if the command instructions instruct multiplexer 506 to output a signal that is 50% of the total current to drive a load as reference voltage 232, then 50% of the current required by output rail 108 will be generated by each of buck controllers 202 and 204. However, if the command instructions instruct multiplexer 506 to output a signal that is 75% of the total current to drive a load as reference voltage 232, then 75% of the current required by output rail 108 will be generated by buck controller 204 while 25% of the current required by output rail 108 will be generated by buck controller 202. In this way power controller 102 may balance power between the power supply rails 104 and 106.

Figure 6:
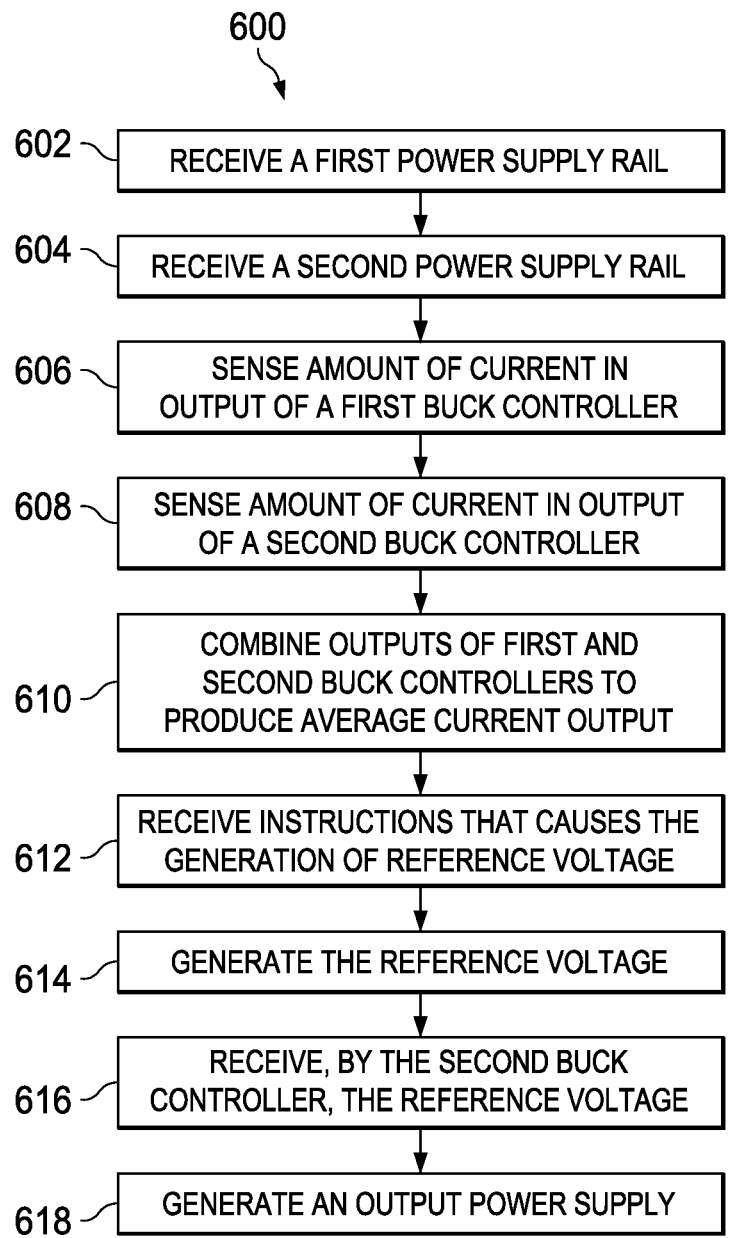
FIG. 6 shows a flow diagram of a method for balancing power between two power supply rails in accordance with various embodiments.

FIG. 6 shows a flow diagram of a method 600 for balancing power between two power supply rails 104 and 106 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by power controller 102 including buck controllers 202 and 204, current sensors 206 and 208, isolation circuit 210, and power balancer 212 and implemented by a processor executing instructions stored in a non-transitory computer readable storage medium.

The method begins in block 602 with receiving power supply rail 104. In an embodiment, power supply rail 104 is received by buck controller 202. In block 604, method 600 continues with receiving power supply rail 106. In an embodiment, power supply rail 106 is received by buck controller 204. Each of power supply rails 104 and 106 may carry different voltages.

In block 606, the method 600 continues with sensing an amount of current in output signal 222. In an embodiment, current sensor 206 may sense the amount of current in output signal 222 from buck controller 202 and output a signal representing the current as output signal 236. Current sensor 206 may utilize a DCR technique to sense the current in output signal 222.

In block 608, the method 600 continues with sensing an amount of current in output signal 224. In an embodiment, current sensor 208 may sense the amount of current in output signal 224 from buck controller 204 and output a signal representing the current as output signal 234. Current sensor 208 may utilize a DCR technique to sense the current in output signal 224.

In block 610, the method 600 continues with combining the signals 234 and 236. In an embodiment, isolation circuit 210 may combine the signals between the two resistors 402 and 404 at node 406 to generate voltage representing the average current as average current signal 230. The average current is the average current of output signals 222 and 224 from buck controllers 202 and 204, respectively.

In block 612, the method 600 continues with receiving command instructions via signal 238. In an embodiment, the command instructions may instruct power balancer 212 as to which signal from the resistor ladder 504 to select as reference voltage 232. In block 614, the method 600 continues with generating the reference voltage 232. Because the reference voltage 232 is chosen by a signal from the resistor ladder 504 which itself comes from average current signal 230, the reference voltage 232 is based on the average current signal 230.

In block 616, the method 600 continues with receiving the reference voltage 232. In an embodiment, buck controller 204 receives reference voltage 232 from power balancer 232. In alternative embodiments, buck controller 204 receives reference voltage 232 from power balancer 232 after reference voltage 232 is filtered by filter 214. In block 618, the method 600 continues with generating output rail 108. In an embodiment, output rail 108 is a combination of output signal 222 from buck controller 202 and output signal 224 from buck controller 204. Buck controller 202 functions as a voltage source for the output rail 108 while buck controller 204 functions as a current source for output rail 108. As the current source for output power rail 108, buck controller 204 controls an amount of current in output rail 108 received from buck controller 202 and an amount of current in output rail 108 received from buck controller 204. The amount of current received by output rail 108 from each of buck controllers 202 and 204 is based on the reference voltage 232.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power controller, comprising:
   a first power supply rail at a first voltage, a second power supply rail at a second voltage, and an output rail;
   a first buck controller having an input coupled to the first power supply rail and having an output coupled to the output rail;
   a second buck controller having an input coupled to the second power supply rail, having an reference voltage input, and having an output coupled to the output railut;
   an isolation circuit having a first isolation input coupled to the output of the first buck controller, a second isolation input coupled to the output of the second buck controller, and an average current output, the isolation circuit including first and second resistors coupled in series between the first isolation input and the second isolation input, and the average current output is coupled to between the first and second resistors; and
   a power balancer having an input coupled to the average current output, a command input, and a reference voltage output coupled to the reference voltage input of the second buck controller.

2. The power controller of claim 1 in which the second buck controller is coupled to the output rail in parallel with the first buck controller.

3. The power controller of claim 1 including:
   a first current sensor having an input coupled to the output of the first buck controller, and having a first sensed output; and
   a second current sensor having an input coupled to the output of the second buck controller, and having a second sensed output.

4. The power controller of claim 3 in which the first current sensor includes direct current resistance (DCR) current sensing circuitry.

5. A power controller, comprising:
   a first power supply rail at a first voltage, a second power supply rail at a second voltage, and an output rail;
   a first buck controller having an input coupled to the first power supply rail and an output coupled to the output rail;
   a second buck controller having an input coupled to the second power supply rail, having an reference voltage input, and having an output coupled to the output rail; and
   a power balancer having an average current input coupled to the outputs of the first and second buck controllers, and having a reference voltage output coupled to the reference voltage input, the power balancer including:
   a resistor ladder having outputs, and
   a multiplexer having inputs coupled to the resistor ladder outputs, a command input, and the reference voltage output.

6. The power controller of claim 5 in which instructions on the command input select a reference voltage from one of the multiplexer inputs.

7. The power controller of claim 6 in which the reference voltage is based on the amount of current from each of the first and second buck controllers required in the output power rail.

8. A power controller, comprising:
   a first power supply rail at a first voltage, a second power supply rail at a second voltage, and an output rail;
   a first buck controller having an input coupled to the first power supply rail and having an output coupled to the output rail;

a second buck controller having an input coupled to the second power supply rail, having an reference voltage input, and having an output coupled to the output rail;

a power balancer having an average current input coupled to the outputs of the first and second buck controllers and having a reference voltage output; and a filter coupling the reference voltage output to the reference voltage input.

9. A method comprising:

receiving on an input of a first buck controller a first power supply rail at a first voltage and generating on an output of the first buck controller a first voltage coupled to an output rail;

receiving on an input of a second buck controller a second power supply rail at a second voltage different from the first voltage, receiving a reference voltage on an input of the second buck controller, and generating on an output of the second buck controller a second voltage coupled to the output rail; and generating the reference voltage based on an average current output by the first and second buck controllers by combining the outputs of the first and second buck controllers between a first and a second resistor of an isolation circuit;

the first buck controller functioning as a voltage source for the output power rail and the second buck controller controlling, based on the reference voltage, an amount of current in the output power rail received from each of the first and second buck controllers, so that differing currents in the first and second buck controllers generates a power in both input rails that is balanced.

10. The method of claim 9, further comprising:

sensing, with a first current sensor, an amount of current in the output of the first buck controller using direct current resistance (DCR) current sensing circuitry; and sensing, with a second current sensor, an amount of current in the output of the second buck controller using direct current resistance (DCR) current sensing circuitry.

11. A method comprising:

receiving on an input of a first buck controller a first voltage and generating on an output of the first buck controller a first voltage coupled to an output rail;

receiving on an input of a second buck controller a second voltage different from the first voltage, receiving a reference voltage on an input of the second buck controller, and generating on an output of the second buck controller a second voltage coupled to the output rail; and generating to the reference voltage input a reference voltage based on an average current output by the first and second buck controllers by combining the outputs of the first and second buck controllers between a first and second resistor of an isolation circuit, the generating the reference voltage includes receiving input signals in a multiplexer and selecting the reference voltage from one of the multiplexer input signals; and the first buck controller functioning as a voltage source for the output power rail and the second buck controller controlling, based on the reference voltage, an amount of current in the output power rail received from each of the first and second buck controllers.

12. The method of claim 11 in which the multiplexer input signals representing a percentage of the total current of the first and second output signals.

13. The method of claim 11 including receiving instructions in the multiplexer via a serial interface that cause the multiplexer to select the reference voltage.

14. The method of claim 11 including coupling the first and second buck controllers in parallel.

15. A system comprising:

a first buck controller having an input coupled to a first power rail at a first voltage and having an output that is coupled to an output rail;

a first current sensor having an input coupled to the output of the first buck controller and having an output;

a second buck controller having an input coupled to a second power rail at a second voltage, having a reference voltage input, and having an output that is coupled to the output rail;

a second current sensor having an input coupled to the output of the second buck controller and having an output;

an isolation circuit coupled to the outputs of the first and second current sensors and having an output; and a power balancer having an input coupled to the output of the isolation circuit, having a command input, and having a reference voltage output coupled to the reference voltage input.

16. A power controller of claim 15, in which the second power supply rail has a different voltage than the first power supply rail.

* * * * *